United States Patent [19]

Kurematsu et al.

[11] Patent Number: 4,618,569

[45] Date of Patent: Oct. 21, 1986

[54] METHOD FOR PROCESSING OF SILVER HALIDE COLOR PHOTOGRAPHIC MATERIAL

[75] Inventors: Masayuki Kurematsu; Shigeharu Koboshi, both of Hino, Japan

[73] Assignee: Konishiroku Photo Industry Co., Ltd., Tokyo, Japan

[21] Appl. No.: 721,568

[22] Filed: Apr. 10, 1985

[30] Foreign Application Priority Data

Apr. 17, 1984 [JP] Japan ................................ 59-77813

[51] Int. Cl.$^4$ ........................ B01D 15/06; G03C 5/24; G03C 7/40

[52] U.S. Cl. .................................... 430/428; 430/372; 430/399

[58] Field of Search ................................ 430/399, 372

[56] References Cited

U.S. PATENT DOCUMENTS

| | | | |
|---|---|---|---|
| 3,253,920 | 5/1966 | Rees et al. | 430/399 |
| 3,869,383 | 3/1975 | Shimamura et al. | 430/398 |
| 3,931,004 | 1/1976 | Shimamura et al. | 430/398 |
| 4,043,907 | 8/1977 | Shimamura et al. | 430/399 |
| 4,163,023 | 7/1979 | Endo et al. | 430/399 |
| 4,336,324 | 6/1982 | Koboshi et al. | 430/372 |
| 4,537,856 | 8/1985 | Kurematsu et al. | 430/372 |

FOREIGN PATENT DOCUMENTS

| | | | |
|---|---|---|---|
| 608224 | 11/1980 | Canada | 430/398 |
| 128720 | 12/1984 | European Pat. Off. | 430/399 |
| 130180 | 3/1978 | Fed. Rep. of Germany | 430/400 |
| 96831 | 8/1978 | Japan | 430/399 |

OTHER PUBLICATIONS

Photographic Processing, "Ideas for Pollution Control", Jul. 1976, vol. 11, No. 6, pp. 13-14, 30.

*Primary Examiner*—John E. Kittle
*Assistant Examiner*—Mukund J. Shah
*Attorney, Agent, or Firm*—Frishauf, Holtz, Goodman & Woodward

[57] ABSTRACT

Disclosed is a method for processing of a photographic silver halide photographic material which comprises carrying out stabilizing processing of a photographic silver halide photographic material directly with a liquid stabilizer substantially without passing through the step of washing with water subsequent to the processing step having fixing ability, wherein processing is conducted while permitting the liquid stabilizer to contact an ion-exchange resin and/or at least a part of the overflow liquid of said liquid stabilizer after contacting the ion-exchange resin is used as the liquid stabilizer.

21 Claims, No Drawings

METHOD FOR PROCESSING OF SILVER HALIDE COLOR PHOTOGRAPHIC MATERIAL

BACKGROUND OF THE INVENTION

This invention relates to a method for processing of a silver halide color photographic material (hereinafter abbreviated as photographic material), particularly to a method for stabilizing processing without carrying out the step of washing with water subsequent to the desilverization step.

An exposed color photographic material is basically processed with a color developing step, bleaching and fixing steps (or bleach-fixing step), and it is further worked with water or processed with a liquid stabilizer.

In recent years, in a photo-finisher which carries out developing processing of photographic materials automatically and continuously, the problems of protection of environments and water resources are regarded as important, and it is desired to reduce a large amount of washing water employed in the water washing step preferably to zero. For this purpose, there have been proposed techniques to carry out stabilizing processing directly after fixing or bleach-fixing processing without performing washing with water. For example, Japanese Laid-open Patent Publications Nos. 8542/1982, 132146/1982, 14834/1982 and 18631/1983 disclose techniques for processing with liquid stabilizer containing isothiazoline derivatives, benzisothiazoline derivatives, soluble iron complexes, polyaminocarboxylic acid or organic phosphonic acids.

These techniques concern methods for inhibiting or preventing the problems caused by the fixing or bleach-fixing components brought into the liquid stabilizer by the photographic material. These techniques are not practically useful when continuous processing is performed for a long time. Particularly, there is involved the drawback that yellow stain at the unexposed portion in the photographic material during prolonged storage after processing is increased.

Also, as another problem, when stabilizing processing without washing with water is conducted continuously for a long term, stain immediately after processing at the unexposed portion is found to be increased disadvantageously, irrespectively of the amount of the fixing and bleach-fixing components entrained into the liquid stabilizer.

SUMMARY OF THE INVENTION

A first object of the present invention is to provide a method for processing colors stably without problem by reducing the concentrations of fixing and bleach-fixing components in the liquid stabilizer. A second object of the present invention is to provide a method for color stabilizing processing of a photographic material without increase in stain at the unexposed portion immediately after processing even when continuous processing may be performed for a long term.

A third object of the present invention is to reduce the amount of the replenishing liquid stabilizer by removing the harmful components in the liquid stabilizer, thereby enabling reuse of the liquid stabilizer.

The above objects of the present invention can be accomplished by a method for processing of a photographic material which comprises carrying out stabilizing processing of a photographic material directly with a liquid stabilizer substantially without passing through the step of washing with water subsequent to the processing step having fixing ability, wherein processing is conducted while permitting the liquid stabilizer to contact an ion-exchange resin and/or at least a part of the overflow liquid of said liquid stabilizer after stabilizer.

According to a preferred embodiment of the present invention, the liquid stabilizer contains a chelating agent having a chelate stability constant with iron ions of 6 or more.

DESCRIPTION OF PREFERRED EMBODIMENTS

The ion-exchange resin to be used in the present invention comprises a three-dimensionally polycondensational polymeric substrate having functional groups bonded thereto, including cation exchange resins, anion exchange resins, chelate resins, adsorptive resins, etc. The polymeric substrate may include, for example, copolymers of styrene with divinylbenzene, a methacrylate or acrylate with divinylbenzene, phenol-formalin resins, etc. Functional groups may be, for example, in the case of cation exchange resins, sulfonic acid group, carboxylic acid group, phosphonic acid group; in the case of anion exchange resins, quarternary ammonium groups, primary to tertiary amine salt structures; in the case of chelate resins, it includes iminodiacetic acid type, polyamine type, amidooxime type, aminophosphoric acid type, pyridine type, dithiocarbamic acid type, etc. There is also an adsorptive resin having no functional group. The polymeric substrate and the functional group are not limited to those as mentioned above.

The above ion-exchange resins are commerically available under various trade names such as Diaion produced by Mitsubishi Kasei Kogyo K.K., Amberlite produced by Organo K.K., Duorite, Sumikaion, Sumichelate produced by Sumitomo Kagaku K.K., Uniselec produced by Unitica K.K. and others.

Of the above ion-exchange resins usable for the present invention as mentioned above, those having particularly preferable effect are anion exchange resins, because of effective reducing of stain found immediately after processing with a long term continuous processing. Chemical structures of the preferable resins are typically illustrated below. Strongly basic ion exchange resins

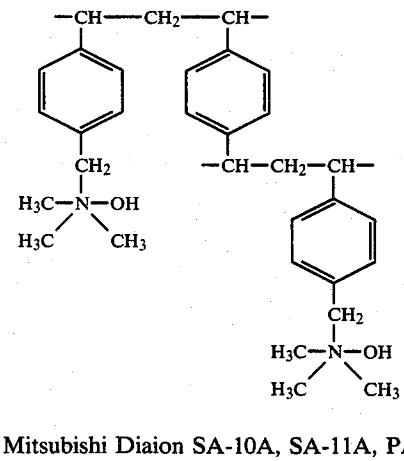

(1)

(e.g. Mitsubishi Diaion SA-10A, SA-11A, PA-308)

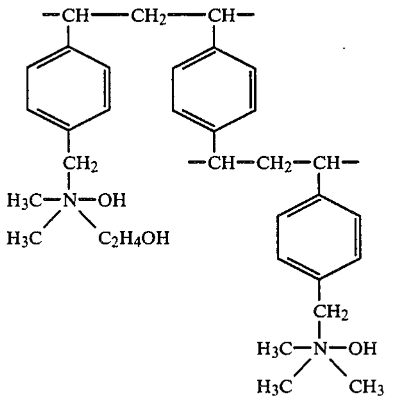
(2)

(e.g. Mitsubishi Diaion SA-20A, SA-21A, PA-408)
Weakly basic ion-exchange resin

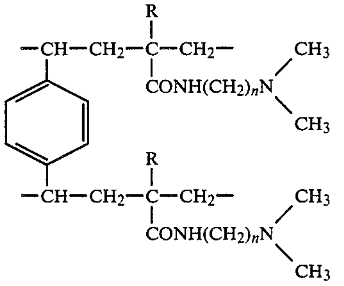
(1)

(e.g. Mitsubishi Diaion WA-10, WA-11) [wherein R is a hydrogen atom, $N(R')_2$ or a lower alkyl group (where R' is a hydrogen atom or a lower alkyl group, with proviso that both cannot be hydrogen atoms), and n is an integer of 0 to 3].

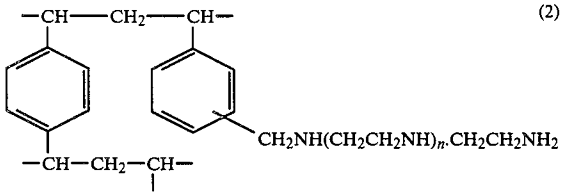
(2)

(n: 0-1) (e.g. Mitsuibishi Diaion WA-20, WA-21).

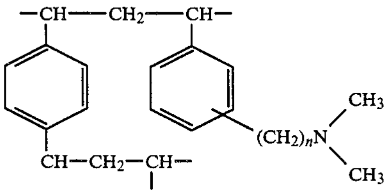
(3)

(n: 1-3) (e.g. Mitsubishi Diaion WA-30).

The anion substituents for these basic ion-exchange resins are not particularly limited, but are preferably $OH^-$, $Cl^-$, $SO_4^{2-}$, $Br^-$, $COOH^-$, $CO_3^{2-}$, and $SO_3^{2-}$.

The above-illustrated ion-exchange resins effectively remove harmful ingredient such as sensitizing dye, anti-irradiation dye and surfactant eluted from photographic material, or EDTA-Fe brought from the previous bath. On the other hand, sulfite ion, ammonium ion or fluorescent brightening agent are hardly removed from the stabilizer, whereby the liquid stabilizer is kept to be in a preferable state.

In addition to the above-mentioned ion-exchange resin, there may be used, for example, a strong acidic resin including gel and porous types having the following unit:

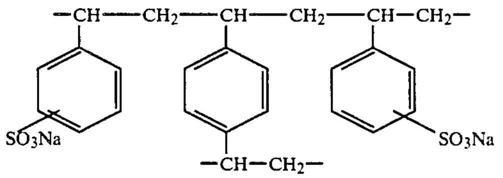

(e.g. Mitsubishi Diaion SK 1B, Diaion SK 102, Diaion SK 104, Diaion SK 106, Diaion SK 110, Diaion SK 112, Diaion SK 116, Diaion PK 208, Diaion PK 212, Diaion PK 216, Diaion PK 220 and Diaion PK 228;

a weakly acidic or basic resin having the following unit:

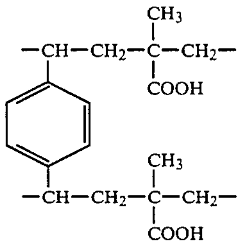

(e.g. Mitsubishi Diaion WK 10 and WK 11): and

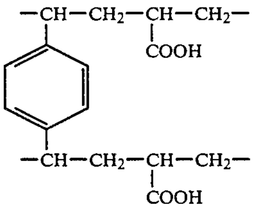

(e.g. Mitsubishi Diaion WK 20); a chelate resin having the following unit:

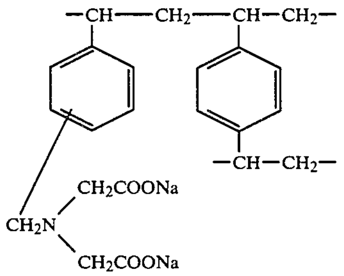

(e.g. Mitsubishi Diaion CR 10); and one having the following unit:

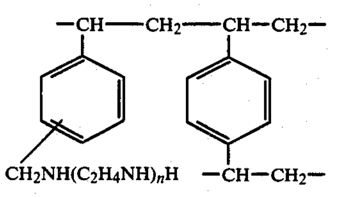

(n is an integer of 1 or more) (e.g. Mitsubishi Diaion CR 20).

The above-described resins are available from Mitsubishi Kasei Kogyo Co.

The chelate stability constant as mentioned in the present invention is generally known as described in L. G. Sillen, A. E. Martell "Stability Constants of Metal-ion Complexes", The Chemical Society, London (1964) and S. Chaberek, A. E. Martell, "Organic Sequestering Agents", Wiley (1959). The chelating agents having a chelate stability constant with iron ions of 6 or more of the present invention may include organic carboxylic acid chelating agents, organic phosphonic acid chelating agents and polyhydroxy compounds. Among them, preferable chelating agents are ethylenediamine diorthohydroxyphenylacetic acid, nitrilotriacetic acid, hydroxyethylenediaminetriacetic acid, diethylenetriaminepentaacetic acid, hydroxyethyliminodiacetic acid, diaminopropanoltetraacetic acid, transcyclohexanediaminetetraacetic acid, ethylenediaminetetrakismethylenephosphonic acid, nitrilotrimethylenephosphonic acid, 1-hydroxyethylidene-1,1-diphosphonic acid, 1,1-diphosphonoethane-2-carboxylic acid, 2-phosphonobutane-1,2,4-tricarboxylic acid, 1-hydroxy-1-phosphonopropane-1,2,3-tricarboxylic acid, catechol-3,5-disulfonic acid, sodium pyrophosphate, sodium tetrapolyphosphate, sodium hexametaphosphate, etc. For the effect of the present invention, particularly preferred are diethylenetriaminepentaacetic acid, 1-hydroxyethylidene-1,1-diphosphonic acid and salts thereof.

The compounds which can desirably be added into the liquid stabilizer of the present invention may include pH controllers such as acetic acid, sulfuric acid, hydrochloric acid, nitric acid, sulfanilic acid, potassium hydroxide, sodium hydroxide, ammonium hydroxide, etc.; anti-fungus agents such as sodium benzoate, hydroxy butylbenzoate, antibiotics, dehydroacetic acid, potassium sorbate, thiabendazole, o-phenylphenol, etc.; preservatives such as 5-chloro-2-methyl-4-isothiazolin-3-one, 2-octyl-4-isothiazolin-3-one, 1,2-benzisothiazoline-3-one, water-soluble metal salts, etc.; dispersants such as ethylene glycol, polyethylene glycol, polyvinyl pyrrolidone, etc.; film hardeners such as formalin, etc.; fluorescent whitening agents; and so on. Among these compounds, most effective are ammonia compounds as disclosed in Japanese Unexamined Patent Publication No. 184345/1984, for example, an ammonium salt of an inorganic acid such as aqueous ammonia, ammonium bromide, ammonium carbonate, ammonium chloride, ammonium chromate, ammonium dichromate, ammonium hypophosphite, ammonium phosphate, ammonium phosphite, ammonium fluoride, acid ammonium fluoride, ammonium fluoroborate, ammonium arsenate, ammonium hydrogen-carboxylate, ammonium hydrogenfluoride, ammonium hydrogensulfate, ammonium hydrogensulfite, ammonium iodide, ammonium nitrate, ammonium pentaborate, ammonium perchlorate, ammonium peroxodisulfate, ammonium persulfate, ammonium phosphomolybdate, ammonium tungstate, ammonium silicofluoride, ammonium sulfamate, ammonium sulfate, ammonium sulfite, ammonium tetraborate, ammonium tetrafluoroborate, ammonium thiocyanate, ammonium tungstate, ammonium banadate, ammonium polyphosphate, ammonium pyrophosphate, etc.; an ammonium salt of an organic salt such as ammonium acetate, ammonium adipate, ammonium taurine tricarboxylate, ammonium benzoate, ammonium carbamate, ammonium citrate, ammonium diethyldithiocarbamate, ammonium formate, ammonium hydrogenmalate, ammonium hydrogenoxalate, ammonium hydrogenphthalate, ammonium hydrogentartarate, ammonium lactate, ammonium malate, ammonium maleate, ammonium oxalate, ammonium phthalate, ammonium picrate, ammonium pyrrolidinedithiocarbamate, ammonium salicylate, ammonium succinate, ammonium sulfanilate, ammonium tartarate, ammonium thioglycolate, ammonium 2,4,6-trinitrophenol, ammonium iminodiacetate, ammonium hydroxyethyliminodiacetate, ammonium nitrilotriacetate, ammonium ethylenediaminetetraacetate, ammonium diethylenetriaminepentaacetate, ammonium hydroxyethylethylenediaminetriacetate, ammonium trans-cyclohexanediaminetetraacetate, ammonium diaminopropanoltetraacetate, ammonium nitrilotripropionate, ammonium nitrilotrismethylenephosphonate, ammonium ethylenediaminetetramethylenephosphate, ammonium 1-hydroxyethylidene-1,1'-diphosphate, ammonium 2-phosphobutane-1,2,4-tricarboxylate, ammonium di-(2-hydroxyethyl)aminomethanesulfonate, etc.; an ammonia-metal complex such as ammonium alum, ammonium ceric sulfate, ammonium manganese sulfate, ammonium ferrous sulfate (dodecahydrate), Reinecke's salt (hydrate), cuprammonia sulfate, ammonia calcium complex salt, ammonia magnesium complex salt, etc. or the like. Namely, these compounds release ammonia or ammonium ion (including hydrated ion) or ammonium hydroxide when added to the liquid stabilizer, and should not be limited to the abovementioned specific compounds.

The liquid stabilizer according to the present invention should desirably be controlled to a pH value of 0.1 to 10, preferably pH 2 to 9, more preferably pH 6 to 8.5.

The processing temperature in stabilizing processing may be 15° C. to 60° C., preferably 20° C. to 45° C. The processing time should preferably as short as possible from the standpoint of rapid processing, but it is generally 20 seconds to 10 minutes, most preferably one minute to 5 minutes. In stabilizing processing by multiple tanks, the processing should be conducted within shorter time in preceding tanks with the processing time being longer in the tanks at the later stages. Particularly, it is preferable to perform processings successively with increased time by 20% to 50% as compared with the preceding tank. Also, it is preferred to employ a counterflow system in which the stabilizing processing step consists of multi-stage tanks and the replenishing liquid is supplied from the final stage tank, from which the liquid is overflowed successively to the tanks in the preceding stages. After the stabilizing processing of the present invention, no processing of washing with water is required, but rinsing with small amount of water within a very short time or surface washing may be conducted.

The processing step comprising fixing agent is intended for desilverization, specifically comprising a bleach-fixing bath or a fixing bath. The bleaching agent is not specifically limited, but it is particularly effective when an organic acid secondly ferric complex is employed. The fixing agent is not also particularly limited, but a thiosulfate may particularly effectively be used. Further, it is more effective to use a bleaching bath or a bleach-fixing bath containing an organic acid ferric complex and a thiosulfate. When carrying out directly the stabilizing processing substantially without washing with water subsequent to the desilverization processing of the present invention, it is also possible to provide a bath for silver recovery or rinsing within a short period of time between the bleaching bath or the bleach-fixing bath and the stabilizing processing. Also, after stabilizing processing, a water draining bath containing a surfactant may be provided. Preferably, however, no such bath for silver recovery, rinsing and water draining should desirably be provided.

The liquid stabilizer used for the present invention should be brought into contact with the photographic material, preferably according to the method conventionally used for dipping a photographic material in processing liquids in general, but the liquid may be applied on both surfaces of the emulsion surface and the conveying leader of the photographic material and the conveying belt by sponge, synthetic fiber cloths, etc. or blasted thereagainst by means of a spray, etc.

To carry out processing while bringing the liquid stabilizer of the present invention into contact with the ion-exchange resin means that the ion-exchange resin contained in a cloth bag, etc. is brought into contact directly with the liquid stabilizer tank wherein the photographic material is processed, or that the ion-exchange resin contained in a bag made of chemical fibers, etc. is placed in a resin column or a filter case connected directly to the tank to be brought into contact with the liquid stabilizer. To use at least a part of the overflow liquid of said liquid stabilizer as the stabilizing solution after contact with the ion-exchange resin means that the liquid stabilizer is taken out from the liquid stabilizer tank and brought into contact with the ion-exchange resin separately from the tank according to the column method or the mixing method, and at least a part thereof is charged into the tank liquid. In this case, charging into the tank liquid may be conducted as a replenishing liquid, but it is desirable to add two-fold or more of the amount to be replenished irrespective of the replenishing system.

The ion-exchange resin of the present invention may be brought into contact with the liquid stabilizer in any of the tanks, when the stabilizing consists of multiple tanks, but preferably in two or more tanks, more preferably in all of the tanks.

According to a preferred embodiment in the case when the stabilizing consists of one tank, the ion-exchange resin is contained in a resin column, which is directly connected to the tank to be brought into contact with the liquid stabilizer.

According to a preferred embodiment wherein the stabilizing bath consists of two tanks, the ion-exchange resin is contained in a resin column or a filter case, which is directly connected to the second tank on the drying side to be brought into contact with the liquid stabilizer. More preferebly, the ion-exchange resin is brought into contact with the liquid stabilizer also similarly in the first tank.

According to a preferred embodiment wherein the stabilizing bath consists of three or more tanks, contact between the ion-exchange resin and the liquid stabilizer is effected by direct connection in the final bath on the drying side similarly as described above. More preferably, in each tank of the stabilizing bath other than the final tank, contact between the ion-exchange resin and the liquid stabilizer is effected by direct connection.

It is most preferred to carry out the present invention by bringing the ion-exchange resin into contact with the liquid stabilizer by direct connection to the tank as mentioned above, but when no installation space can be taken for resin column or filter case in an automatic developing machine, as another preferred embodiment, the liquid stabilizer overflow or liquid stabilizer taken out forcibly from the tank liquid may be brought into contact with the ion-exchange resin and returned to the stabilizing bath.

In the case when the stabilizing tank consists of one tank, the liquid stabilizer taken out is brought into contact with the ion-exchange resin using a resin column, and the liquid stabilizer after contact is returned to the tank. In this case, it is preferable to add a liquid stabilizer component to the stabilizing solution after contact.

When the stabilizing bath consists of two or more tanks, the overflow from the tank nearest to the processing step having fixing ability and the resin column are utilized to effect contact with the ion-exchange resin, and thereafter returned to the tank nearer to the drying side.

In this case, the liquid returned should desirably be supplemented with the liquid stabilizer components. Also, although the liquid stabilizer after contact with the ion-exchange resin may be reused as the replenishing liquid, it is desirable in this case to add the liquid stabilizer components.

The ion-exchange resin in the present invention, after contact with the liquid stabilizer, should desirably be brought into contact with fixing liquid or bleach-fixing liquid and thereafter regenerated. Particularly, in the case of anion exchange resins, silver recovery can be done by regeneration of resins to give a great effect.

The present invention is described in more detail by referring to the following Examples.

EXAMPLE - 1

As the photographic material, Sakura color paper (produced by Konishiroku Photo Industry Co.) was used and the experiments were carried out with the processing liquids and the pocessing steps as shown below.

| Standard processing steps | | |
|---|---|---|
| [1] Color developing | 38° C. | 3 min. 30 sec. |
| [2] Bleach-fixing | 33° C. | 1 min. 30 sec. |
| [3] Stabilizing processing | 25° C.-30° C. | 3 min. |
| [4] Drying | 75° C.-80° C. | ca. 2 min. |

| Processing liquid composition (Color developing tank liquid) | |
|---|---|
| Benzyl alcohol | 15 ml |
| Ethylene glycol | 15 ml |
| Potassium sulfite | 2.0 g |
| Potassium bromide | 1.3 g |
| Sodium chloride | 0.2 g |
| Potassium carbonate | 30.0 g |
| Hydroxylamine sulfate | 3.0 g |
| Polyphosphoric acid (TPPS) | 2.5 g |
| 3-Methyl-4-amino-N—ethyl-N—(β-methanesulfonamidoethyl)aniline sulfate | 5.5 g |
| Fluorescent whitening agent (4,4'-diaminostilbenzsulfonic acid derivative) | 1.0 g |

-continued

| | |
|---|---|
| Catechol-3,5-disulfonic acid | 0.3 g |
| (made up to one liter with addition of water and adjusted to pH 10.00 with KOH). | |
| (Color developing replenishing liquid) | |
| Benzyl alcohol | 22 ml |
| Ethylene glycol | 20 ml |
| Potassium sulfite | 3.0 g |
| Potassium carbonate | 30.0 g |
| Hydroxylamine sulfate | 4.0 g |
| Polyphosphoric acid (TPPS) | 3.0 g |
| 3-Methyl-4-amino-N—ethyl-N—($\beta$-methanesulfonamidoethyl)aniline sulfate | 7.5 g |
| Fluorescent whitening agent (4,4'-diaminostilbenzsulfonic acid derivative) | 1.5 g |
| Catechol-3,5-disulfonic acid | 0.3 g |
| (made up to one liter with addition of water and adjusted to pH 10.50 with KOH). | |
| (Bleach-fixing tank liquid) | |
| Ferric ammonium ethylenediaminetetra-acetate dihydrate | 60 g |
| Ethylenediaminetetraacetic acid | 3 g |
| Ammonium thiosulfate (70% solution) | 100 ml |
| Ammonium sulfite (40% solution) | 27.5 ml |
| (adjusted to pH 7.1 with potassium carbonate or glacial acetic acid and made up to one liter with addition of water). | |
| (Bleach-fixing replenishing liquid A) | |
| Ferric ammonium ethylenediaminetetra-acetate dihydrate | 260 g |
| Potassium carbonate | 42 g |
| (made up to one liter with addition of water, pH of this solution is 6.7 ± 0.1). | |
| (Bleach-fixing replenishing liquid B) | |
| Ammonium thiosulfate (70% solution) | 500 ml |
| Ammonium sulfite (40% solution) | 150 ml |
| Ethylenediaminetetraacetic acid | 17 g |
| Glacial acetic acid | 85 ml |
| (made up to one liter with addition of water, pH of this solution is 4.6 ± 0.1). | |
| (Stabilizing tank liquid and replenishing liquid) | |
| Diethylenetriaminepentaacetic acid | 2.0 g |
| 5-Chloro-2-methyl-4-isothizoline-3-one | 0.03 g |
| 2-Methyl-4-isothiazoline-3-one | 0.03 g |
| (made up to one liter with water and adjusted to pH 4.0). | |

EXPERIMENT - 1

An automatic developing machine was filled with the above color developing tank liquid, bleach-fixing liquid and liquid stabilizer, and while processing a color paper subjected to imagewize exposure, the above color developing replenishing liquid, bleach-fixing replenishing liquids A and B and stabilizing replenishing liquid were supplied through quantitating cups at intervals of 3 minutes to carry out continuous processing. The amounts replenished per 1 $m^2$ of color paper were 170 ml for the color developing tank, each 25 ml of bleach-fixing replenishing liquids A and B for the bleach-fixing tank and the three points of 100 ml, 300 ml and 1 liter for the stabilizing processing tank.

The stabilizing processing tanks in the automatic developing machine consisted of stabilizing tanks of the first to the third tank in the direction of the flowing of photographic material, replenishment being performed from the final tank according to the multi-stage counter-current system wherein the overflow from the final tank was permitted to flow into the tank in its preceding stage and the overflow from this stage was further permitted to flow into its preceding stage.

Continuous processing was performed until the total amount of the liquid stabilizer replenished became 3-fold of the stabilizing tank volume, and samples were obtained by processing of unexposed color paper. For comparative purpose, samples were also prepared by changing the stabilizing processing to washing with running water.

For measurement of yellow stain on instant day on said samples, reflectances at 445 nm were measured to obtain the results as shown in Table 1, and further for measurement of yellow stain with lapse of time, the samples were stored at 70° C. and 80% RH for 3 weeks and then subjected to measurement of yellow stain with blue light by means of an optical densitometer (PDA-65, produced by Konishiroku Photo Industry Co.) to obtain the results as shown in Table 1.

EXPERIMENT - 2

In Experiment - 1, to each of the first tank to the third tank of the stabilizing processing tanks was connected directly a resin column, in which weakly basic ion-exchange resin Diaion WA-30 (produced by Mitsubishi Kasei Kogyo Co.) was charged, and the experiment was conducted in the same manner as in Experiment - 1. The results of yellow stain are shown in Table 1.

EXPERIMENT - 3

The same experiment as Experiment - 1 was carried out except for changing the ion-exchange resin used in Experiment - 2 to a chelate resin Diaion CR-20 (produced by Mitsubishi Kasei Kogyo Co.) and the results of yellow stain are shown in Table 1.

TABLE 1

| Replenishing amount (per 1 $m^2$) | Yellow stain on instant day Reflectance (%) 445 nm | | | Yellow stain after storage optical density (blue light) | | |
|---|---|---|---|---|---|---|
| | 1 lit. | 300 ml | 100 ml | 1 lit. | 300 ml | 100 ml |
| Experiment 1 | | | | | | |
| Washing with running water | (10 liter or more per 1 $m^2$) | | 82 | (10 liter or more per 1 $m^2$) | | 0.32 |
| Liquid stabilizer (no resin) | 78 | 76 | 72 | 0.30 | 0.36 | 0.44 |
| Experiment 2 | | | | | | |
| Ion-exchange resin CR-30 | 82 | 82 | 82 | 0.25 | 0.25 | 0.25 |
| Experiment 3 | | | | | | |
| Ion-exchange resin CR-20 | 81 | 81 | 81 | 0.29 | 0.31 | 0.33 |

As apparently seen from Table 1, by use of the liquid stabilizer of the prior art, yellow stain on the instant day is higher than by washing with water, and yellow stain is greater as the replenishing amount is smaller. As to yellow stain after storage, although it is lower as compared with washing with water when the replenishing amount is one liter per 1 $m^2$, yellow stain is increased when the replenishing amount is further reduced. Accordingly, it cannot practically be used for the purpose of reducing the amount of water used to a great extent and reducing the amount of waste liquid.

Whereas, in the present invention according to experiments 2 and 3, wherein ion-exchange resins were brought into contact with liquid stabilizer, it can be understood that yellow stain was small on the instant day and yellow stain after storage is also considerably suppressed, thus indicating very effective results.

Also, the Experiment 2 employing WA-30 which is an anion exchange resin as the ion-exchange resin can be appreciated to be very effective as compared with the Experiment 3.

When similar experiments were carried out by changing the ion-exchange resin to strongly acidic resins SK-1B, PK-208, weakly acidic resins WK-10, WK-20, chelate resins CR-10, CR-40, high-porous polymer HP-20 (Diaion produced by Mitsubishi Kasei Kogyo Co.), effects similar to that of the chelate resin CR-20 in the Experiment 3 were obtained.

EXAMPLE - 2

The same processing liquids, the processing steps and the processing method as in Example - 1 were employed, except for changing the stabilizing processing bath to one tank, and the liquid stabilizer recipes as shown in Table 2 were employed.

A strongly basic resin SA-10B (Diaion produced by Mitsubishi Kasei Kogyo Co.) was charged into a resin column connected directly to a tank separate from the automatic developing machine, and while performing the operation to transfer the automatic developing liquid stabilizer to the separate tank when the stabilizing replenishing liquid quantity reaches 1/100 of the stabilizing tank volume and, after contacting with the ion-exchange resin, bring back to the automatic developing liquid stabilizer tank, continuous processing was carried out until the total amount of the stabilizing replenishing liquid became 3-fold of the stabilizing tank volume to effect processing of unexposed color paper to give a sample, followed by the same experiment as in the Experiment - 1 in Example - 1. The results of yellow stain are shown in Table 2.

The amount of the liquid stabilizer supplemented was made 100 ml per 1 $m^2$ of the photographic material. For comparative purpose, the same experiment was conducted with the use of the liquid stabilizer recipe No. 8 shown in Table 2 without contact with the resin to obtain the results shown in Table 2.

TABLE 2

| No. | Stabilizing tank liquid and replenishing liquid (made up to 1 liter with water and adjusted to pH 6.0 with KOH and $H_2SO_4$) | | Yellow stain on instant day Reflectance (%) 445 nm | Yellow stain after storage optical density (blue light) |
|---|---|---|---|---|
| 1 | Anti-fungus agent (o-phenylphenol) | 0.1 g | 80 | 0.33 |
| 2 | Anti-fungus agent | 0.1 g | 82 | 0.25 |
| | 1-hydroxyethyliden-1,1-diphosphonic acid | 5 g | | |
| 3 | Anti-fungus agent | 0.1 g | 81 | 0.27 |
| | Nitrilotrimethylene-phosphonic acid | 5 g | | |
| 4 | Anti-fungus agent | 0.1 g | 81 | 0.27 |
| | Hydroxyethylenediamine-triacetic acid | 5 g | | |
| 5 | Anti-fungus agent | 0.1 g | 80 | 0.30 |
| | Glycine | 5 g | | |
| 6 | Anti-fungus agent | 0.1 g | 82 | 0.21 |
| | Nitrilotrimethylene-phosphonic acid | 5 g | | |
| | Ammonia water (25%) | 5 g | | |
| 7 | Anti-fungus agent | 0.1 g | 82 | 0.17 |
| | 1-Hydroxyethylidene-1,1-diphosphonic acid | 5 g | | |
| | Ammonia water | 5 g | | |
| | $MgSO_4$ | 1 g | | |
| 8 | Anti-fungus agent | 0.1 g | 71 | 0.48 |
| | 1-Hydroxyethylidene-1,1-diphosphonic acid | 5 g | | |

As apparently seen from Table 2, as compared with the results of No. 8 for comparative purpose employing no ion-exchange resin, in the case of No. 1 to No. 7 according to the present invention wherein strongly basic resins SA-10 B were brought into contact with liquid stabilizers, the samples were found to be preferably white with high reflectance at 445 nm on the instant day, with yellow stain after storage at lapse of time being scarcely generated, thus exhibiting very effective results of the invention.

Also, the effect of the present invention is preferably exhibited in samples No. 2 - No. 7 in which chelating agents are added into the liquid stabilizer to be used in the present invention. Among them, it can be seen that the chelating agents employed in No. 2, 3, 4 are more preferable, and 1-hydroxyethylidene-1,1'-diphosphonic acid employed in No. 2 is the most preferred. Further, it can also be seen that No. 6, 7 employing a combination of a chelating agent with an ammonium compound are more preferable, particularly the combination of ammonia with 1-hydroxyethylidene-1,1'-diphosphonic acid.

When the resin after contact with the liquid stabilizer was brought into contact with the bleach-fixing tank liquid, and electrolytic silver recovery was conducted by addition of a sulfite salt to the eluate eluted from the resin after contact with ammonia water, the silver recovery efficiency was found to be very good.

EXAMPLE - 3

When the liquid stabilizer overflow of No. 7 in Example 2 was passed through a resin column containing a weakly basic resin WA-30 and used as 50% of the water for the replenishing liquid, the results obtained were very good, being approximately the same as those in Example - 2.

EXAMPLE - 4

The liquid stabilizer overflow processed without contact with the resin of No. 8 in Example - 2 was collected in a large amount, divided into aliquots, which were then permitted to contact various ion-exchange resins. By using liquid stabilizer after contacting the above ion-exchange resin following the processing steps of Example - 1, color paper was subjected to developing processing and evaluated according to the same method as in Example - 1. The resins found to have the effect of the present invention are enumerated below.

Diaion SK-1B, SK-102, SK-103, SK-104, SK-106, SK-110, SK-112, SK-116, SA-10A, SA-10B, SA-11A, SA-11B, SA-20A, SA-20B, SA-21A, SA-21B, PK-204, PK-208, PK-212, PK-216, PK-220, PK-224, PK-228, PA-304, PA-306, PA-308, PA-310, PA-312, PA-314, PA-316, PA-318, PA-320, PA-404, PA-406, PA-408, PA-410, PA-412, PA-414, PA-416, PA-418, PA-420, WK-10, WK-11, WK-20, WA-10, WA-11, WA-20, WA-21, WA-30, CR-10, CR-20, CR-40, SKN-1, SKN-2, SKN-3, SAN-1, HP-10, HP-20, HP-30, HP-40, HP-50, produced by Mitsubishi Kasei Kogyo Co. were found to have the effect and combinations of these resin gave also similar effects.

We claim:

1. A method for processing of a silver halide photographic material which comprises carrying out stabilizing processing of a silver halide photographic material directly with a liquid stabilizer substantially without passing through the step of washing with water subsequent to the desilverization processing step, wherein processing is conducted while at least one of (i) contacting the liquid stabilizer with an ion-exchange resin or (ii) at least a part of the overflow liquid stabilizer after contacting the ion-exchange resin is used as the liquid stabilizer to prevent yellow stains in the photographic material immediately after processing or during storage thereafter.

2. The method for processing of a silver halide photographic material according to claim 1, wherein said liquid stabilizer contains a chelating agent having a chelate stability constant with iron ions of 6 or more.

3. The method for processing of a silver halide photographic material according to claim 2, wherein said chelating agent is an organic carboxylic acid or salt thereof chalating agent, an organic phosphonic acid or salt thereof chelating agent, or a polyhydroxy compound.

4. The method for processing of a silver halide photographic material according to claim 3, wherein said chelating agent is ethylenediamine diorthohydroxyphenylacetic acid, nitrilotriacetic acid, hydroxyethylenediaminetriacetic acid, diethylenetriaminepentaacetic acid, hydroxyethyliminodiacetic acid, diaminopropanoltetraacetic acid, transcyclohexanediaminetetraacetic acid, nitrilotrimethylenephosphonic acid, ethylenediaminetetrakismethylenephosphonic acid, 1-hydroxyethylidene-1, 1-diphosphonic acid, 1,1-diphosphonoethane-2-carboxylic acid, 2-phosphonobutane-1,2,4-tricarboxylic acid, 1-hydroxy-1-phosphonopropane-1,2,3-tricarboxylic acid, catechol-3,5-disulfonic acid, a salt of the foregoing acids, sodium pyrophosphate, sodium tetrapolyphosphate or sodium hexametaphosphate.

5. The method for processing of a silver halide photographic material according to claim 4, wherein said chelating agent is diethylenetriaminepentaacetic acid, 1-hydroxyethylidene-1,1-diphosphonic acid or a salt thereof.

6. The method for processing of a silver halide photographic material according to claim 1, wherein said ion-exchange resin comprises a three-dimensionally polycondensational polymeric substrate having functional groups bonded thereto, selected from the group consisting of a cation exchange resin, an anion exchange resin, a chelate resin and an adsorptive resin.

7. The method for processing of a silver halide photographic material according to claim 6, wherein said ion-exchange resin is an anion exchange resin.

8. The method for processing of a silver halide photographic material according to claim 6, wherein said polymeric substrate is a copolymer of styrene with divinylbenzene, a copolymer of a methacrylate or an acrylate with divinylbenzene or a phenol-formal resins.

9. The method for processing of a silver halide photographic material according to claim 8, wherein said polymeric substrate is copolymer of styrene with divinylbenzene.

10. The method for processing of a silver halide photographic material according to claim 6, wherein said functional group is in the case of cation exchange resins, a sulfonic acid group, a carboxylic acid group or a phosphonic acid group; in the case of anion exchange resins, a quarternary ammonium group, a primary to tertiary amine salt group; in the case of chelate resins, an iminodiacetic acid group, a polyamine group, an amidooxime group, an aminophosphoric acid group, a pyridine group or a dithiocarbamic acid group.

11. The method for processing of a silver halide photographic material according to claim 1, wherein said liquid stabilizer has a pH value of 0.1 to 10.

12. The method for processing of a silver halide photographic material according to claim 11, wherein said liquid stabilizer has a pH value of 6 to 8.5.

13. The method for processing of a silver halide photographic material according to claim 1, wherein the processing temperature in said stabilizing processing is 15° to 60° C.

14. The method for processing of a silver halide photographic material according to claim 13, wherein said processing temperature in stabilizing processing is 20° to 45° C.

15. The method for processing of a silver halide photographic material according to claim 1, wherein said stabilizing bath is in one tank and the ion-exchange resin contained in a resin column is directly connected to the tank to be brought into contact with the liquid stabilizer.

16. The method for processing of a silver halide photographic material according to claim 1, wherein said stabilizing bath is in two tanks and the ion-exchange resin is contained in a resin column or a filter case or is directly connected to the second tank on the drying side to be brought into contact with the liquid stabilizer.

17. The method for processing of a silver halide photographic material according to claim 1, wherein said stabilizing bath is in at least three tanks and the liquid stabilizer in the final tank is contacted to the ion-exchange resin.

18. The method for processing of a silver halide photographic material according to claim 16, wherein said ion-exchange resin is brought into contact with liquid stabilizer in other at least two tanks.

19. The method for processing of a silver halide photographic material according to claim 17, wherein said ion-exchange resin is brought into contact with liquid stabilizer in other at least two tanks.

20. The method for processing of a silver halide photographic material according to claim 18, wherein said ion-exchange resin is brought into contact with liquid stabilizer in all the tanks.

21. The method for processing of a silver halide photographic material according to claim 19, wherein said ion-exchange resin is brought into contact with liquid stabilizer in all the tanks.

* * * * *